US010102204B2

(12) United States Patent
Kohl et al.

(10) Patent No.: US 10,102,204 B2
(45) Date of Patent: Oct. 16, 2018

(54) MAINTAINING ACCESS CONTROL LISTS IN NON-IDENTITY-PRESERVING REPLICATED DATA REPOSITORIES

(71) Applicant: INTERNATIONAL BUSINESS MACHINES CORPORATION, Armonk, NY (US)

(72) Inventors: John T. Kohl, Arlington, MA (US); Masabumi Koinuma, Lexington, MA (US); Margaret Marynowski, Chelmsford, MA (US); Huichung Wu, Billerica, MA (US); Mark S. Zukowsky, Beverly, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1270 days.

(21) Appl. No.: 13/681,515

(22) Filed: Nov. 20, 2012

(65) Prior Publication Data

US 2014/0143214 A1 May 22, 2014

(51) Int. Cl.
*G06F 17/30* (2006.01)
*G06F 21/60* (2013.01)
(Continued)

(52) U.S. Cl.
CPC ........ *G06F 17/30* (2013.01); *G06F 17/30575* (2013.01); *G06F 21/604* (2013.01);
(Continued)

(58) Field of Classification Search
CPC ............... G06F 21/604; G06F 21/6218; G06F 21/6236; G06F 17/30; G06F 17/30575; H04L 63/20
See application file for complete search history.

(56) References Cited

U.S. PATENT DOCUMENTS

| 8,713,060 B2* | 4/2014 | Sivasubramanian et al. ............... 707/802 |
| 2007/0143859 A1* | 6/2007 | Ogi ....................... G06F 21/604 726/27 |

(Continued)

OTHER PUBLICATIONS

Oracle Database PL/SQL Packages and Type Reference, Aug. 2012, web.archive.org.*

(Continued)

*Primary Examiner* — Tarek Chbouki
(74) *Attorney, Agent, or Firm* — Cuenot, Forsythe & Kim, LLC

(57) ABSTRACT

Managing access control lists (ACLs) across replicated data repositories can include selecting, from a first data processing system, a controlled object and an ACL object bound to the controlled object, wherein the first data processing system is associated with a first user identity space, and creating, using a processor, a replicated version of the controlled object within a second data processing system associated with a second user identity space, wherein the second user identity space is different from the first user identity space. Managing ACLs further includes, creating, using the processor, a replicated version of the ACL object within the second data processing system and substituting, within the replicated version of the ACL object, an identity from the first user identity space with a selected identity from the second user identity space.

10 Claims, 4 Drawing Sheets

(51) Int. Cl.
  *G06F 21/62* (2013.01)
  *H04L 29/06* (2006.01)
(52) U.S. Cl.
  CPC ...... *G06F 21/6218* (2013.01); *G06F 21/6236* (2013.01); *H04L 63/20* (2013.01)

(56) References Cited

U.S. PATENT DOCUMENTS

2012/0110087 A1* 5/2012 Culver ............... G06F 17/5004
                                                                  709/205
2013/0191338 A1* 7/2013 Ducott et al. ................ 707/634

OTHER PUBLICATIONS

Oracle XML DB, Aug. 2005, Oracle, Developer's Guide 10.2.*
Ngamsuriyaroj S, et al. "Maintaining Consistency of the Security Policy in Distributed Environment," Conference Proceedings of the IEEE International Performance, Computing, and Communications Conference (Cat. No. 02CH37326), pp. 179-186, 2002, retrieved from the Internet: <http://220.68.70.190/kut/graduate/sec/00995149.pdf>.
Wozniak, J.M. et al., "Access Control for a Replica Management Database," Proceedings of the Second ACM International Workshop on Storage Security and Survivability, Storage SS'06, pp. 41-46, retrieved from the Internet: <http://www.nd.edu/~ccl/research/pubs/access-storagess06.pdf>.

* cited by examiner

MAINTAINING ACCESS CONTROL LISTS IN NON-IDENTITY-PRESERVING REPLICATED DATA REPOSITORIES

BACKGROUND

There is often a need to share data among a variety of different parties. A company, for, example, may need to share data among multiple computing environments. For purposes of illustration, consider the case in which each computing environment in which data is shared corresponds to a different geographic location in the company or possibly one or more third party entities working in cooperation with the company. One way of sharing data is through the use of replicated data repositories. A replicated data repository can be provided to each third party, other company location, etc., having a need for shared data.

A data repository typically utilizes structures referred to as Access Control Lists (ACLs) to restrict access to the various artifacts included therein. Each ACL determines which users or groups of users are permitted to access the artifact to which the ACL is associated or bound within the data repository. In many cases, however, the users of each computing environment among which the replicated data repositories are shared are different. The computing environments can be said to have different user identity spaces. This can make synchronization of ACLs difficult, thereby complicating the sharing of data.

BRIEF SUMMARY

A method of managing access control lists (ACLs) across replicated data repositories includes, selecting, from a first data processing system, a controlled object and an ACL object bound to the controlled object, wherein the first data processing system is associated with a first user identity space, and creating, using a processor, a replicated version of the controlled object within a second data processing system associated with a second user identity space, wherein the second user identity space is different from the first user identity space. The method further includes creating, using the processor, a replicated version of the ACL object within the second data processing system and substituting, within the replicated version of the ACL object, an identity from the first user identity space with a selected identity from the second user identity space.

A method of managing ACLs across replicated data repositories includes receiving, within a target data processing system having a target data repository, an operation log generated from a source data processing system having a source replica data repository. The method further includes selectively replaying the operation log within the target replica data repository according to at least one of a type of the source replica data repository or a type of the target replica data repository.

DETAILED DESCRIPTION

Figure 1:
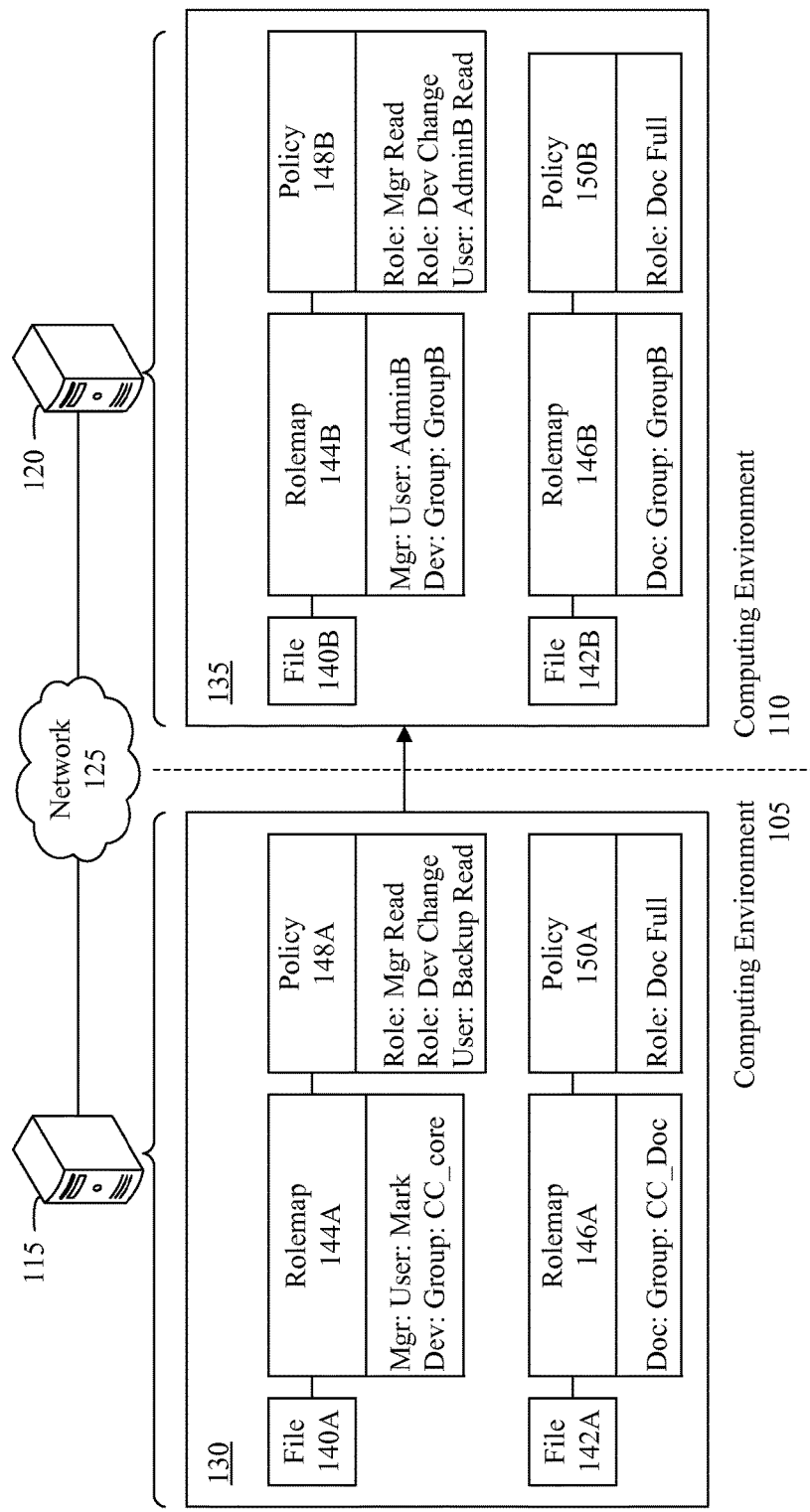
FIG. 1 is a block diagram illustrating an exemplary system for maintaining access control lists (ACLs).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium is non-transitory in nature. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

One or more embodiments relate to maintaining access control lists (ACLs) in a non-identity preserving, replicated data repository. In accordance with the inventive arrangements disclosed within this specification, ACLs for a data repository associated with a first user identity space can be maintained when the data repository is replicated to a different computing environment associated with a second and different user identity space. A user identity substitution technique can be used. Within ACLs, one or more user identities of the first user identity space of the data repository can be substituted with one or more user identities from the second user identity space when the data repository is replicated to the different computing environment. Further aspects of maintaining ACLs are described within this specification with reference to the drawings.

FIG. 1 is a block diagram illustrating an exemplary system for maintaining ACLs. As shown, FIG. 1 illustrates a computing environment 105 and a computing environment 110. Computing environment 105 is independent, and different from, computing environment 110. Each of computing environments 105 and 110 is formed of, or includes, one or more data processing systems that are communicatively linked through appropriate networks. The one or more data processing systems of computing environment 105 are represented by data processing system 115. The one or more data processing systems of computing environment 120 are represented by data processing system 120.

For ease of illustration, data processing system 115 is used interchangeably with computing environment 105. Similarly, data processing system 120 is used interchangeably with computing environment 110. Data processing system 115 is communicatively linked with data processing system 120 by network 125. Exemplary implementations of network 125 include a WAN, a LAN, a wireless network, a mobile network, a Virtual Private Network (VPN), the Internet, other known networks and/or various combinations of the listed network types.

Data processing system 115 hosts or stores a data repository 130. A "data repository" refers to a database that stores a collection of controlled objects. Examples of controlled objects include, but are not limited to, files and directories. A controlled object is an object that is associated with an ACL. A data repository is typically hierarchical in nature. Data repository 130 is a preserving replica. A "preserving replica" refers to a data repository that shares a same user identity space with one or more other replicas, or replicated versions, of a data repository. As such, data repository 130 is a replicated version of another data repository (not shown) and has a same user identity space as that data repository.

A "replicated version" of an object, as used within this specification, refers to a duplicate or exact copy of the particular object from which the replicated version is created. Subsequent to replication or replicating, i.e., copying, the replicated version may be modified as described within this specification. Upon initial creation, however, the replicated version of an object is a duplicate of the particular object from which the replicated version is created. A replica of a data repository is a copy of the data repository, e.g., a copy of the controlled objects of the data repository. Whether the ACLs of the replica are the same as the original data repository depends upon whether the replica is reserving or non-preserving as described in further detail within this specification.

A "user identity space" refers to a computing environment having a defined set of users and/or user groups. Two computing environments that have a same user identity space or that share a same user identity space have same users and same user groups. A "user" refers to a human being that operates or uses a particular data processing system. An "identity" of a user refers to data that uniquely identifies or distinguishes that user from one or more other users of the same user identity space. Similarly, an identity of a group of users refers to data that uniquely identifies or distinguishes that group from one or more other groups of the same user identity space. For example, an identity can be a user name or other unique identifier associated with a user and/or a group.

As shown, data repository 130 includes various controlled objects. In this example, the controlled objects are files 140A and 142A. Each of files 140A and 142A is associated with an ACL. An ACL, in general, includes two control objects which are also referred to as "ACL objects." The ACL or control objects include a rolemap and a policy. A rolemap is a programmatic structure that is directly associated with, or bound to, a controlled object. A "binding" refers to an association, e.g., a logical or programmatic association, between two entities, e.g., between a user identity and a user role, between a file and a rolemap, between a rolemap and a policy, etc. A rolemap defines the particular users or groups that are associated with various roles. A "role" is a classification of a user into a particular group according to job, function, expertise, etc. Examples of roles include "manager" or "mgr" "developer" or "dev" or the like. More than one user can be assigned to a same role. A "policy" is a programmatic structure that is associated with, or bound to, a particular rolemap, and thus indirectly associated with a controlled object. A policy grants particular privileges, rights, permissions, etc. to particular roles. Collectively, the rolemap and policy form the ACL of a controlled object.

Referring again to FIG. 1, the ACL of file 140A is formed of rolemap 144A and policy 148A. The ACL of file 142A is associated with rolemap 146A and policy 150A. It should be appreciated that any users and/or groups specified within rolemaps 144A, 146A and policies 148A and 150A are users and/or groups within the user identity space for computing environment 105.

Data repository 135 is a non-preserving replica. Data repository 135 is considered a replica of data repository 130 in many respects, but differs from data repository 130 in other respects to be described herein in greater detail. For example, computing environment 110, and as such data repository 135, does not share a user identity space with computing environment 105. As such, when data repository 130, or some portion thereof, is replicated from data processing system 115 to data processing system 120, elements of data repository 130 such as controlled objects, are replicated to form data repository 135. File 140A, for example, is replicated to data repository 135 as file 140B, which is identical to file 140A. Similarly, file 142A is replicated to data repository 135 as file 142B, which is identical to file 140A.

Other elements, however, are modified. Various user identities and/or user groups are substituted within the ACLs when replicated from data processing system 115 to data processing system 120. For example, referring to rolemaps and/or policies, any users and/or groups from the user identity space of the preserving replica, e.g., data repository 130, are substituted with one or more users and/or groups of the user identity space for the non-preserving replica, i.e., the user identity space of data repository 135 and computing environment 110.

Thus, rolemap 144B is a replicated version of rolemap 144A. Within rolemap 144B, however, the user "AdminB" is substituted for the user "Mark". Similarly, the group "GroupB" is substituted for the group "CC_core." Rolemap 146B is a replicated version of rolemap 146A. Within rolemap 146B, "GroupB" is substituted for the group "CC_Doc." Policy 148B is a replicated version of policy 148A. Within policy 148B, however, the user "AdminB" is substituted for the user "Backup." Policy 150B is a replicated version of policy 150A. Policy 150B is identical to policy 150A.

In one aspect, the particular user identity or group identity used to replace a user identity or group identity within an ACL is the user or group identity of the particular user that is performing the operation. For example, referring to file 140B, the user performing the operation in data repository 135 is "AdminB" belonging to "GroupB." AdminB is a user and GroupB is a group within the user identity space for computing environment 110. Thus, the user and group identities of the user performing the replication operation are substituted for the user "Mark" and the group "CC_core" from data repository 130. The same is true for policy 148B where "AdminB" is substituted for "Backup."

In other cases to be described herein in great detail, the particular actions performed with respect to rolemaps and/or policies vary according to the particular operation performed. Whereas FIG. 1 illustrates the act of replicating data repository 130 to create data repository 135, other exemplary operations include the creation of a new controlled object and the modification of an ACL.

Figure 2:
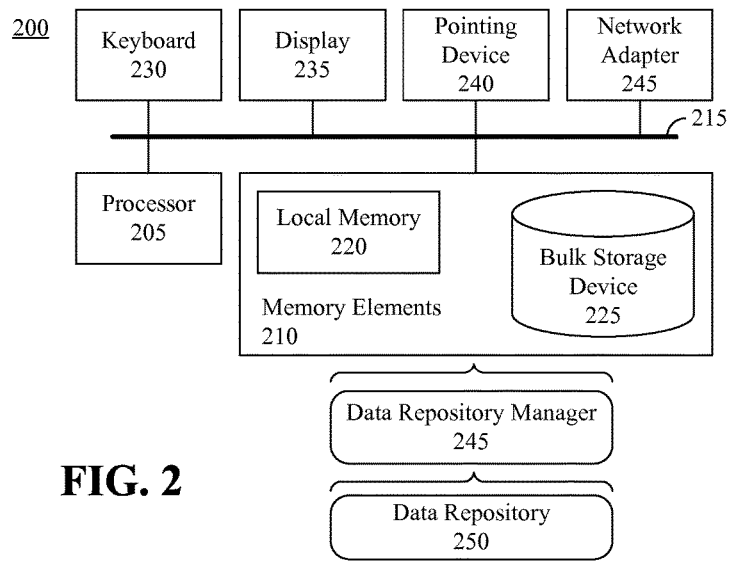
FIG. 2 is a block diagram illustrating an example of a data processing system.

FIG. 2 is a block diagram illustrating an example of a data processing system (system) 200. Data processing system 115 and/or data processing system 120 of FIG. 1 can be implemented as system 200 executing suitable operational software as described. System 200 includes at least one processor 205 coupled to memory elements 210 through a system bus 215 or other suitable circuitry. An example of processor 205 is a central processing unit. As such, system 200 stores program code within memory elements 210. Processor 205 executes the program code accessed from memory elements 210 via system bus 215.

In one aspect, system 200 is implemented as a computer or other programmable data processing apparatus that is suitable for storing and/or executing program code. It should be appreciated, however, that system 200 can be implemented in the form of any system including a processor and memory that is capable of performing the functions and/or operations described within this specification.

Memory elements 210 can include one or more physical memory devices such as, for example, local memory 220 and one or more bulk storage devices 225. Local memory 220 refers to RAM or other non-persistent memory device(s) generally used during actual execution of the program code. Bulk storage device(s) 225 can be implemented as a hard disk drive (HDD), solid state drive (SSD), or other persistent data storage device. System 200 also can include one or more cache memories (not shown) that provide temporary storage of at least some program code in order to reduce the number of times program code must be retrieved from bulk storage device 225 during execution.

Input/output (I/O) devices such as a keyboard 230, a display 235, and a pointing device 240 optionally can be coupled to system 200. The I/O devices can be coupled to system 200 either directly or through intervening I/O controllers. One or more network adapters 245 also can be coupled to system 200 to enable system 200 to become coupled to other systems, computer systems, remote printers, and/or remote storage devices through intervening private or public networks. Modems, cable modems, and Ethernet cards are examples of different types of network adapters 245 that can be used with system 200.

As pictured in FIG. 2, memory elements 210 can store a data repository manager (manager) 245. Manager 245, being implemented in the form of executable program code, is executed by system 200 and, as such, is considered an integrated part of system 200 as is data repository 250. Data repository 250 is representative of data repository 130 when system 200 represents an implementation of data processing system 115. Data repository 250 is representative of data repository 135 when system 200 represents an implementation of data processing system 120. System 200 is programmed to perform the various operations described within this specification.

Figure 3:
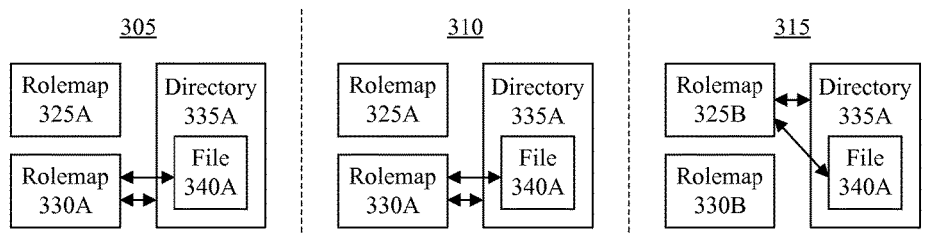
FIG. 3 is a block diagram illustrating an exemplary technique for processing ACLs.

FIG. 3 is a block diagram illustrating an exemplary technique for processing ACLs. FIG. 3 illustrates three different data repositories 305, 310, and 315. Each of data repositories 305, 310, and 315 are replicated data repositories. A replicated data repository can be referred to as a "replica data repository" or simply as a "replica." Data repositories 305 and 310 are preserving data repositories and, as such, have a same user identity space. Data repository 315 is non-preserving and, as such, has a different user identity space than data repositories 305 and 310.

FIG. 3 illustrates an example in which a controlled object is created within a preserving data repository and how creation of the controlled object is managed at another preserving data repository and a non-preserving data repository. A controlled object, e.g., an element such as file 340A, is created within another controlled object, e.g., directory 335A. Within data repository 305, file 340A and directory 335A both are associated with rolemap 330A.

The act of creating an element is captured or recorded in the form of an operation log or "oplog." An operation log is a record of one or more programmatic actions that are performed at a data repository that can be replayed at one or more other replicas. Replaying the operation log at another data repository, e.g., another replica, causes the actions specified by the operation log to be performed at or within the particular data repository at which the operation log is replayed. Replaying an operation log, however, is performed differently based upon the operation to be performed and whether the operation is to be performed at or within a preserving replica or a non-preserving replica.

Within the system hosting data repository 305, an operation log is generated that describes the creation of file 340A within directory 335A. The operation log is replayed by the data processing system storing data repository 310. Replaying of the operation log causes the data processing system to create file 340A (e.g., a replicated version or copy of file 340A from data repository 305) within directory 335A of data repository 310. Because data repositories 305 and 310 have a same user identity space, both file 340A and directory 335A within data repository 310 are bound to rolemap 330A as is the case in data repository 305.

Replay of same operation is performed differently within data repository 315, which is a non-preserving replica. In the case where an element such as file 340A is created within directory 335A of data repository 315, file 340A is bound to the rolemap to which directory 335A is bound. While file 340A within data repository 315 is a replicated version of file 340A of data repository 305, the user identity space of data repository 315 is different from that of data repository 305. Accordingly, any element created within a directory type of controlled object is bound to the rolemap of the directory. Thus, since directory 335A is bound to rolemap 325B in data repository 315, file 340A, when created within directory 335A of data repository 315 is also bound to rolemap 325B.

Figure 4:
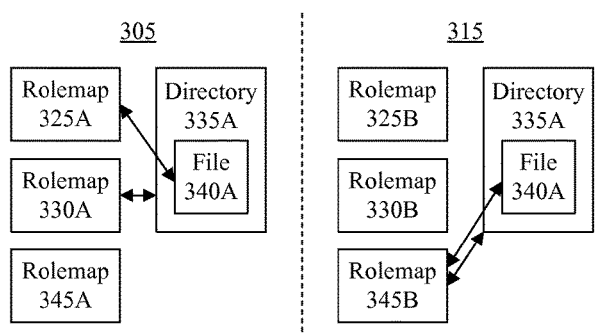
FIG. 4 is a block diagram illustrating an exemplary technique for processing ACLs.

FIG. 4 is a block diagram illustrating an exemplary technique for processing ACLs. FIG. 4 illustrates a situation that differs from that shown in FIG. 3. In FIG. 4, within the preserving replica that is data repository 305, directory 335A is bound to a different rolemap, i.e., rolemap 330A, than file 340A, which is bound to rolemap 325A. Rolemap 345A is unused. The operation log that is created responsive to creation of file 340A can include an indication that the file is not bound to the same rolemap as the directory in which the file was created.

When the operation log is replayed in data repository 315, which is a non-preserving replica, file 340A is created. File 340A, however, is bound to the same rolemap as directory 335A. In the example presented, in data repository 315, directory 335A is bound to rolemap 345B, which is different from the rolemap to which directory 335A is bound in data repository 305. Accordingly, within data repository 315, file 340A is bound to rolemap 345B, like directory 335A. The data processing system replaying the operation log detects the indication that the created file was bound to a different rolemap than the directory in data repository 305 and, responsive to creating file 340A within data repository 315 and establishing the binding with rolemap 345, issues a warning. For example, the data processing system provides a visual or audible warning of the detected condition, thereby putting the user or administrator on notice that the binding of file 340A to rolemap 345B is one that likely requires modification or changing.

Figure 5:
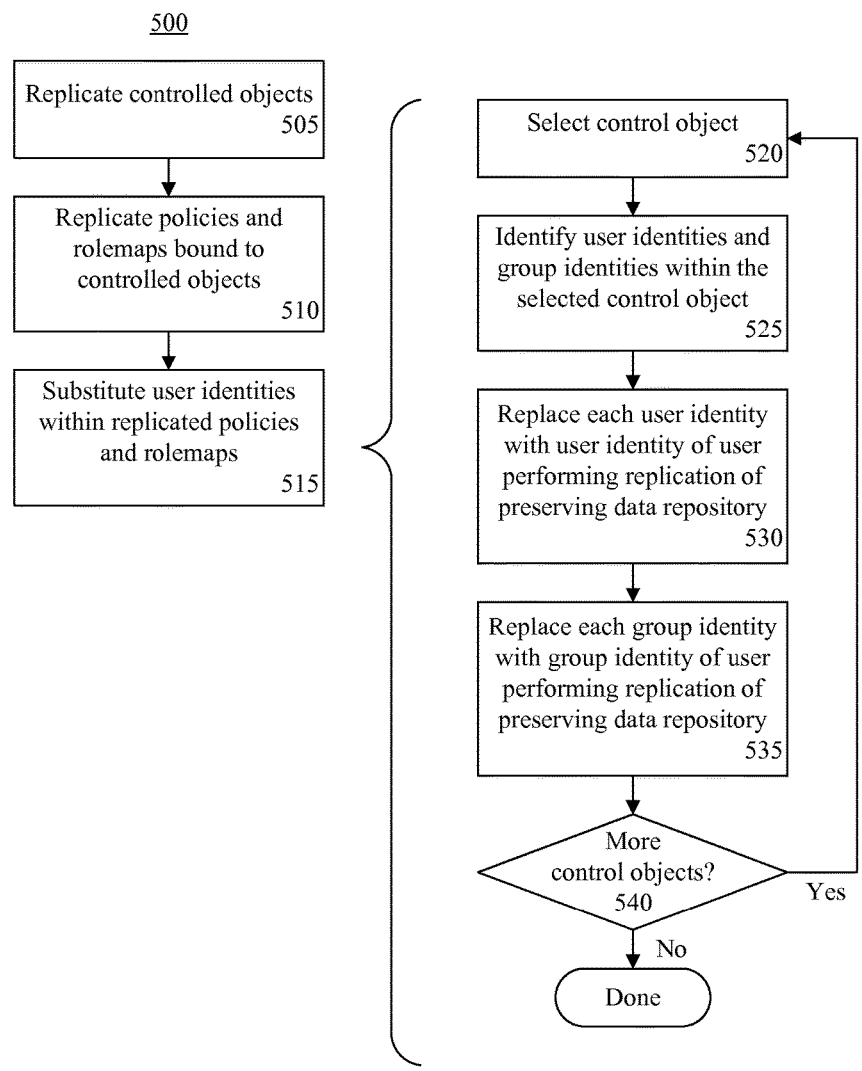
FIG. 5 is a flow chart illustrating an example of a method of processing ACLs.

FIG. 5 is a flow chart illustrating an example of a method 500 of processing ACLs. More particularly, FIG. 5 illustrates an exemplary technique for creating a non-preserving replica type of data repository from a preserving replica type of data repository. Method 500 is performed by a data processing system as described within this specification.

In block 505, the data processing system replicates controlled objects of a preserving data repository within a first computing environment to a second computing environment. The data processing system creates a replicated version of each controlled object, e.g., directories and files, of the preserving data repository within the second computing environment, which is the computing environment in which the non-preserving replica is being generated. In block 510, the data processing system replicates policies and rolemaps of the controlled objects from the preserving replica to the second computing environment. The data processing system creates a replicated version of each rolemap and policy along with the corresponding bindings between rolemap and controlled object and policy and rolemap from the preserving replica to the second computing environment.

In block 515, the data processing system performs identity substitutions for the policies and rolemaps. Identity substitution during data repository replication is generally illustrated within FIG. 1. In further illustration, block 515 is broken out into further detail shown in blocks 520-540.

In block 520, the data processing system selects an ACL object, e.g., a rolemap or a policy. In block 525, the data processing system identifies user identities and group identities within the selected ACL object. The identified user identities and group identities are from the user identity space associated with the preserving data repository being replicated.

In block 530, the data processing system replaces each user identity identified in block 525 with the user identity of the user that is performing the replication of the preserving data repository to the second computing environment. The user identity of the user performing the operation belongs to the user identity space of the second computing environment and, as such, the non-preserving data repository being created.

In block 535, the data processing system replaces each group identity identified in block 525 with the group identity of the user that is performing the replication of the preserving data repository to the second computing environment. The group identity of the user performing the operation belongs to the user identity space of the second computing environment and, as such, the non-preserving data repository being created.

In block 540, the data processing system determines whether there are any further ACL objects to be processed. If so, method 500 loops back to block 520 to continue processing. If not, method 500 is done.

Once method 500 is completed, the non-preserving data repository is generated. The user identities and group identities within policies and rolemaps are those from the user identity space of the second computing environment. Any further changes to identities, roles, or the like can be implemented by an administrator as deemed necessary.

Figure 6:
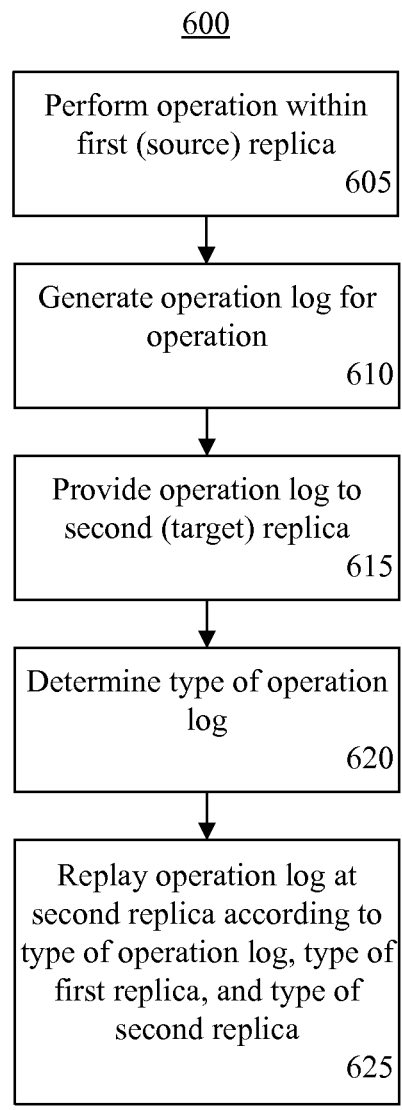
FIG. 6 is a flow chart illustrating an example of a method of processing ACLs.

FIG. 6 is a flow chart illustrating an example of a method 600 of processing ACLs. More particularly, FIG. 6 illustrates an exemplary technique for replaying an operation log. Method 600 is performed by a data processing system as described within this specification.

In block 605, a first data processing system hosting a first replica (e.g., a replica of a data repository) performs an operation. For example, the first replica can be a preserving replica data repository. In block 610, the first data processing system generates an operation log specifying the particular operation that was performed. For ease of illustration, the particular replica and/or data processing system in which an operation log is created is referred to as the "source."

In block 615, the operation log is provided to a second data processing system that hosts a second replica. For example, the second replica can be a non-preserving replica data repository. The particular replica in which an operation log is replayed or the data processing system that replays the operation log can be referred to as the "target." In block 620, the second data processing system determines a type of the operation specified within the operation log. In block 625, the second data processing system replays the operation log according to type of the operation, type of the first (source) replica, and type of the second (target) replica.

The particular action that is performed in the target replica will vary according to the operation specified therein. Further, the action performed varies according to whether the source of the operation log is a preserving or non-preserving replica and whether the target of the operation, e.g., the particular data processing system to replay the operation log, hosts a preserving or non-preserving replica.

In applying changes, conflict avoidance is implemented through the use or acquisition of mastership. Mastership is applied on a per-object basis. Accordingly, acquisition of mastership of an object by a data processing system, and as such, the particular replica hosted by the data processing system, grants that data processing system a right to implement changes to the object over which mastership is acquired. Mastership for an object is acquired by only one data processing system (data repository) at a time and granted from the other data repositories. Mastership is applied in a more relaxed manner to a non-preserving replica than for a preserving replica. At a non-preserving replica, for example, changes to an ACL object such as a policy or a rolemap can be made without acquiring mastership.

In illustration, role bindings within a rolemap, e.g., a binding of a role to an identity, can be changed at a non-preserving replica without the non-preserving replica first acquiring mastership. By comparison, modification of a role binding in a rolemap within the preserving replica is disallowed without the preserving replica data repository first acquiring mastership of the rolemap.

Modification of a binding between a controlled object and a rolemap, e.g., unbinding the controlled object from a first rolemap and binding the controlled object to a second and different rolemap, within a non-preserving replica is allowed without the non-preserving replica first acquiring mastership of the controlled object, the first rolemap, and the second rolemap. Modification of a binding between a controlled object and a rolemap within a preserving replica without the preserving replica first acquiring mastership of the controlled object is disallowed.

Modification of a policy, e.g., a right or privilege within the policy, within a non-preserving replica without the non-preserving replica first acquiring mastership of the policy is allowed. Modification of a policy within a preserving replica without the preserving replica first acquiring mastership of the policy is disallowed.

An unbinding, e.g., the breaking of a binding or association, of a rolemap from a first policy and a subsequent binding of the rolemap to a second policy without a non-preserving replica first acquiring mastership of the rolemap, the first policy, and the second policy is disallowed.

By applying mastership as noted, changes to replicas, e.g., by the replaying of an operation log, can be handled as follows. A create operation log is an operation log specifying the creation of an object. The object that is to be created can be a controlled object or an ACL object. When a create operation log generated at a preserving replica is replayed at a non-preserving replica, the substitutions for identities described within this specification are performed, where any identities of an ACL object of the source replica (preserving) are replaced with the identity of the particular user or account replaying the operation log for the target replica (non-preserving).

Similarly, a create operation log generated at a non-preserving replica is replayed at a preserving replica. As part of the creation operation that is performed, the substitutions described are performed with identities of the non-preserving replica (source) being replaced with the identity of the user or account initiating the replaying at the preserving replica (target).

A modification operation log generated at a non-preserving replica is not replayed at a preserving replica. The modification operation log is stored within the non-preserving replica. The modification operation log is also sent to all other replicas, but not replayed at the other replicas. Rather, the modification operation log is stored. An example of a modification operation log includes an operation that changes the rolemap to which a particular controlled object is bound. Not replaying such a modification operation log allows the non-preserving replica to make changes independently of other replicas that have different user identity spaces.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including,"

"comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A method of managing access control lists (ACLs) across replicated data repositories, the method comprising:
   selecting, from a first data processing system, a controlled object and an ACL object bound to the controlled object, wherein the first data processing system is associated with a first user identity space;
   creating, using a processor, a replicated version of the controlled object within a second data processing system associated with a second user identity space, wherein the second user identity space is different from the first user identity space;
   creating, using the processor, a replicated version of the ACL object within the second data processing system; and
   substituting, within the replicated version of the ACL object, an identity from the first user identity space with a selected identity from the second user identity space.

2. The method of claim 1, wherein the identity is a user identity or a group identity of the first user identity space.

3. The method of claim 1, wherein the selected identity is a user identity or a group identity of a user initiating the creating of the replicated version of the controlled object and the creating of the replicated version of the ACL object.

4. The method of claim 1, wherein the first data processing system comprises a preserving replica data repository and the second data processing system comprises a non-preserving replica data repository, the method further comprising:
   responsive to creating a new ACL object within the non-preserving replica data repository, generating a create operation log;
   replaying the create operation log within the preserving replica data repository creating a replicated version of the new ACL object within the preserving data repository; and
   in the preserving data repository, substituting an identity within the replicated version of the new ACL object of the second user identity space with an identity of a user of the first user identity space initiating the replaying.

5. The method of claim 1, wherein the first data processing system comprises a preserving replica data repository and the second data processing system comprises a non-preserving replica data repository, the method further comprising:
   responsive to modifying an ACL object within the non-preserving data repository, generating a modification operation log; and
   sending the modification operation log to at least one other replica data repository without replaying the modification operation log at the at least one other replica data repository.

6. The method of claim 1, wherein the first data processing system comprises a preserving replica data repository and the second data processing system comprises a non-preserving replica data repository, the method further comprising:
   responsive to generating an element in the preserving replica data repository, generating a create element operation log;
   replaying the create element operation log within the non-preserving replica data repository creating a replicated version of the element within the non-preserving replica data repository; and
   in the non-preserving replica data repository, binding the replicated version of the element to a rolemap of a parent directory in which the replicated version of the element is created.

7. The method of claim 1, wherein the first data processing system comprises a preserving replica data repository and the second data processing system comprises a non-preserving replica data repository, the method further comprising:
   allowing modification of a role binding in a rolemap within the non-preserving replica data repository without the non-preserving replica data repository first acquiring mastership of the rolemap; and disallowing modification of a role binding in a rolemap within the preserving replica data repository without the preserving replica data repository first acquiring mastership of the rolemap.

8. The method of claim 1, wherein the first data processing system comprises a preserving replica data repository and the second data processing system comprises a non-preserving replica data repository, the method further comprising:

allowing a modification of a policy within the non-preserving replica data repository without the non-preserving replica data repository first acquiring mastership of the policy; and disallowing modification of a policy within the preserving replica data repository without the preserving replica data repository first acquiring mastership of the policy.

9. The method of claim 1, wherein the first data processing system comprises a preserving replica data repository and the second data processing system comprises a non-preserving replica data repository, the method further comprising:

allowing a modification of a binding between a controlled object and a rolemap within the non-preserving replica data repository without the non-preserving replica data repository first acquiring mastership of the controlled object; and disallowing a modification of a binding between a controlled object and a rolemap within the preserving replica data repository without the preserving replica data repository first acquiring mastership of the controlled object.

10. The method of claim 1, wherein the first data processing system comprises a preserving replica data repository and the second data processing system comprises a non-preserving replica data repository, the method further comprising:

disallowing an unbinding of a rolemap from a first policy and a subsequent binding of the rolemap to a second policy without the non-preserving replica data repository first acquiring mastership of the rolemap, the first policy, and the second policy.

* * * * *